United States Patent
Dhanabalan et al.

(10) Patent No.: US 10,250,637 B2
(45) Date of Patent: Apr. 2, 2019

(54) SYSTEM AND METHOD OF PRE-ESTABLISHING SSL SESSION CONNECTIONS FOR FASTER SSL CONNECTION ESTABLISHMENT

(71) Applicant: Citrix Systems, Inc., Fort Lauderdale, FL (US)

(72) Inventors: Praveen Raja Dhanabalan, Bangalore (IN); Chaitra Maraliga Ramaiah, Bangalore (IN); Akshata Bhat, Bangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 168 days.

(21) Appl. No.: 15/010,692

(22) Filed: Jan. 29, 2016

(65) Prior Publication Data
US 2017/0223053 A1    Aug. 3, 2017

(51) Int. Cl.
*H04L 9/00* (2006.01)
*H04L 29/06* (2006.01)
*H04L 29/08* (2006.01)

(52) U.S. Cl.
CPC ........ *H04L 63/166* (2013.01); *H04L 63/0823* (2013.01); *H04L 63/1408* (2013.01); *H04L 67/04* (2013.01); *H04L 67/10* (2013.01); *H04L 67/12* (2013.01); *H04L 67/125* (2013.01); *H04L 67/14* (2013.01); *H04L 67/146* (2013.01); *H04L 67/2823* (2013.01); *H04L 67/2842* (2013.01); *H04L 67/42* (2013.01)

(58) Field of Classification Search
CPC .................................................. H04L 63/166
USPC .......................................................... 713/151
See application file for complete search history.

(56) References Cited

U.S. PATENT DOCUMENTS 8,145,768 B1 * 3/2012 Hawthorne ........... H04L 63/166
709/205
8,255,291 B1 * 8/2012 Nair ................... G06F 17/30864
705/26.64

(Continued)

OTHER PUBLICATIONS

Freier, A. et al.; "The Secure Sockets Layer (SSL) Protocol Version 3.0"; Internet Engineering Task Force, Request for Comments: 6101; Aug. 2011; 67 pages; The Internet Society.

(Continued)

*Primary Examiner* — Ashokkumar B Patel
*Assistant Examiner* — Syed M Ashan
(74) *Attorney, Agent, or Firm* — Allen, Dyer, Doppelt & Gilchrist, P. A

(57) ABSTRACT

An appliance and a method of pre-establishing SSL session connections for SSL connection establishment are provided. The appliance comprises a secure session pre-handshake establishment module configured to facilitate a secure session connection between an appliance and a server associated with a website, wherein the facilitation causes the appliance to receive session information, determine whether session information corresponding to the secure session connection request has been cached, determine whether the server is associated with a server group based on the determination that session information has not been cached, and form secure session connections between the appliance and servers listed in the server group based on the determination that the server is associated with a server group.

33 Claims, 10 Drawing Sheets

(56) References Cited

U.S. PATENT DOCUMENTS

2011/0231652 A1* 9/2011 Bollay .................. H04L 63/166
713/153
2016/0134646 A1* 5/2016 Wing .................... H04L 63/166
726/23

OTHER PUBLICATIONS

Dierks, T. et al.; "The Transport Layer Security (TLS) Protocol Version 1.2"; Network Working Group, Request for Comments: 5246; Aug. 2008; 104 pages; The Internet Society.
Salowey, J. et al.; "Transport Layer Security (TLS) Session Resumption without Server-Side State"; Network Working Group, Request for Comments: 5077; Jan. 2008; 20 pages; The Internet Society.

* cited by examiner

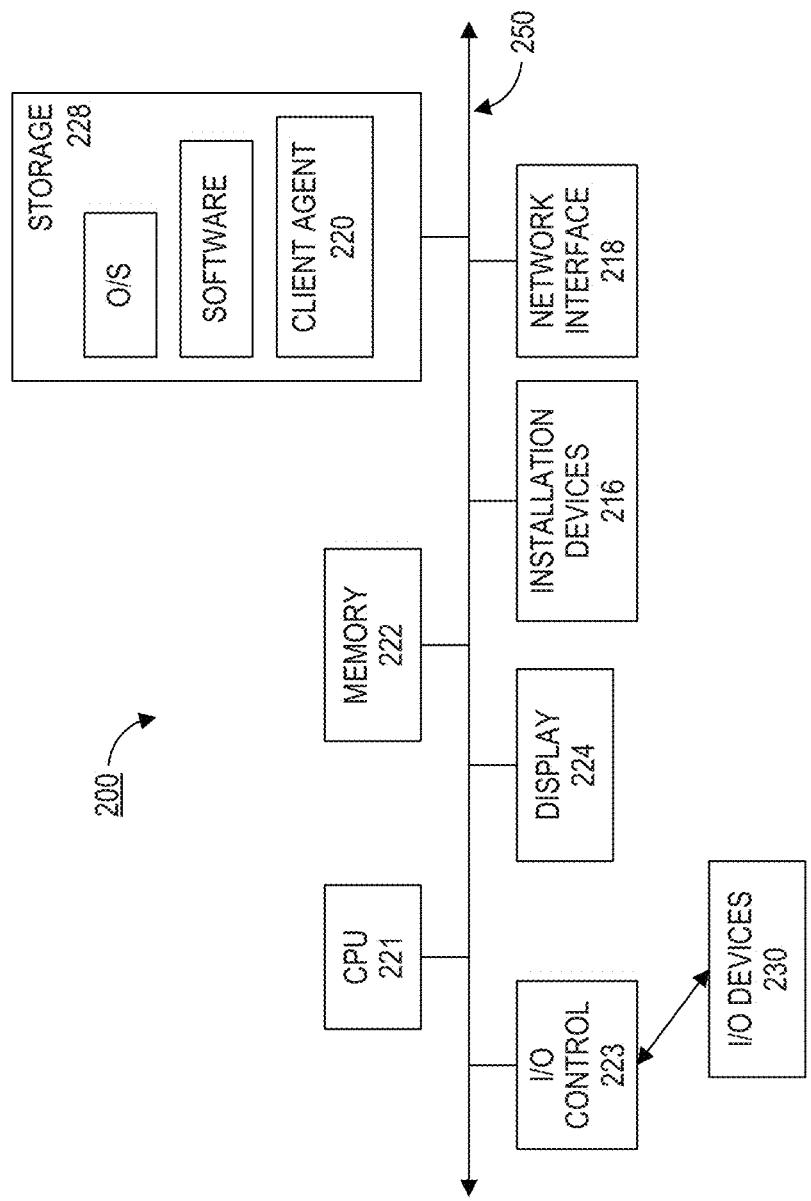

| SERVER GROUP FOR A CLIENT DEVICE 910 | SERVER GROUP ID 920A | HEAD SERVER NAME 930A | https://amazon.com/userID:9j32nk/blueray/part1 | |
|---|---|---|---|---|
| | | FREQUENCY COUNT OF HEAD SERVER NAME, 931A | 5 | |
| | | LIST OF SUB-SERVER NAMES 940A | SERVER NAME 941A | https://blueraymall.com/blueray/partA |
| | | | FREQUENCY COUNT OF SERVER NAME 941A, 942A | 5 |
| | | | SERVER NAME 941B | https://bestbuy/blueray/partB |
| | | | FREQUENCY COUNT OF SERVER NAME 941B, 942B | 7 |
| | | | SERVER NAME 941C | https://officedepot.com/blueray/partC |
| | | | FREQUENCY COUNT OF SERVER NAME 941C, 942C | 3 |
| | | SESSION-RELATED PARAMETER 950A | IF SESSION IDENTIFIER 951A | session identifier, session id length, chosen ciphersuite, chosen compression, start time, max fragment length, the master key, and other related flags and details |
| | | | IF SESSION TICKET 952 | session ticket, session ticket length, and session ticket lifetime |
| | | TIMEOUT 960A | 00:15:01 | |
| | ... | ... | | |
| | SERVER GROUP ID 920B | HEAD SERVER NAME 930B | http://www.youtube.com/singer/song | |
| | | FREQUENCY COUNT OF HEAD SERVER NAME, 931A | 5 | |
| | | LIST OF SUB-SERVER NAMES 940B | SERVER NAME 941X | http://myblog.com/videoclip/song/partX |
| | | | FREQUENCY COUNT OF SERVER NAME 941X, 942X | 6 |
| | | | SERVER NAME 941Y | http://pandora.com/singer/musicvideo/partY |
| | | | FREQUENCY COUNT OF SERVER NAME 941Y, 942Y | 6 |
| | | SESSION-RELATED PARAMETER 950B | SESSION IDENTIFIER 951B | session identifier, session id length, chosen ciphersuite, chosen compression, start time, max fragment length, the master key, and other related flags and details |
| | | TIMEOUT 960B | 00:05:21 | |

FIG. 9

SYSTEM AND METHOD OF PRE-ESTABLISHING SSL SESSION CONNECTIONS FOR FASTER SSL CONNECTION ESTABLISHMENT

BACKGROUND

A middlebox is a network appliance that manipulates Internet traffic by optimizing data flow across the network. Middleboxes can be configured as wide area network ("WAN") optimizers and can be deployed in pairs across two geographically separated locations to optimize data traffic between the two middleboxes. Middleboxes can be connected through a single link or multiple links such as a leased line link and a broadband link. Middleboxes, which may be called WAN optimizers, can work as a pair of devices with primary job of optimizing the network traffic, providing better user experience.

For high availability networks, it is common to establish secure connections between two end point entities, for example between a client device and a web server. One or more middleboxes can be deployed between the two end point entities. Middleboxes can proxy one or more secure connections by monitoring secure connections on a first link between one end point entity and a middlebox and forming a new secure connection between the middlebox and the other end point entity based on the first link.

In a typical Secure Socket Layer/Transport Layer Security (SSL/TLS) connection between a client and a server, a single web session to a server can create multiple SSL/TLS connections to a server. Also when a web page gets refreshed, multiple secure connections are created to a server. In the environment where multiple SSL/TLS connections to the server are proxied by a cluster of middleboxes, each of the connections can be proxied by a different middlebox from the cluster. Based on current technology, each of the middleboxes in the cluster would have to establish an SSL full handshake with the server to obtain certificates and to compute necessary keys for establishing a secure connection.

The problem is that, more often than not, a single connection request to the server associated with a single website is ensued by a series of user requests to other related websites and lead to multiple SSL session connections to different servers with different fully qualified domain names. To establish these connections, the middlebox has to establish an SSL full handshake with each of the server and other related servers to obtain a certificate and compute necessary security keys to establish a secure channel. This task is, however, highly CPU intensive and might involve an additional Round Trip Time (RTT) and additional data to fetch the certificate chain.

SUMMARY

In some aspects, a system for optimizing network traffic is described. The system includes a plurality of appliances, each appliance comprising an SSL pre-handshake establishment module. The secure session pre-handshake establishment module is configured to facilitate a secure session connection between a client device and a server associated with a website, wherein the facilitation causes the appliance to receive session information. The secure session pre-handshake establishment module is also configured to determine whether session information corresponding to the secure session connection request has been cached, and determine whether the server is associated with a server group based on the determination that session information has not been cached. The secure session pre-handshake establishment module is further configured to form secure session connections between the appliance and servers listed in the server group based on the determination that the server is associated with a server group.

In another aspect, a method of pre-establishing Secure Socket Layer (SSL) session connections for SSL connection establishment. The method includes facilitating a secure session connection request between an appliance and a server associated with a website, wherein the facilitation causes the appliance to receive session information. The method also includes determining whether session information corresponding to the secure session connection request has been cached, and determining whether the server is associated with a server group based on the determination that session information has not been cached. The method can further include forming secure session connections between the appliance and servers listed in the server group based on the determination that the server is associated with a server group.

In yet another aspect, non-transitory computer readable storage medium is described. The storage medium stores a set of instructions that are executable by at least one processor of an appliance to cause the appliance to perform a method of pre-establishing SSL session connections for SSL connection establishment. The method comprises facilitating a secure session connection request between an appliance and a server associated with a website, wherein the facilitation causes the appliance to receive session information, determining whether session information corresponding to the secure session connection request has been cached, determining whether the server is associated with a server group based on the determination that session information has not been cached, and forming secure session connections between the appliance and servers listed in the server group based on the determination that the server is associated with a server group.

BRIEF DESCRIPTION OF THE DRAWINGS

Reference will now be made to the accompanying drawings showing example embodiments of this disclosure. In the drawings:

FIGS. 2A-2B are block diagrams of an exemplary computing device, consistent with embodiments of the present disclosure.

FIG. 9 is an exemplary data structure providing a server group for a client device, consistent with embodiments of the present disclosure.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide improved efficiency of secure connections in a network. The efficient secure connections can be realized by proxying a secure connection between one middlebox device and a server, e.g., a web server, via SSL/TLS full handshake procedure, and using server group information containing a head server name and sub-servers names associated with the head server name and session information, frequency count information, etc. This can improve efficiency of SSL/TLS connections without necessarily performing SSL/TLS full handshake procedures whenever receiving a new session connection request to the same server. Moreover, the embodiments described herein can be less CPU intensive and can use less Round Trip Time (RTT) and less data to fetch the certificate chain in computing session keys.

Figure 1:
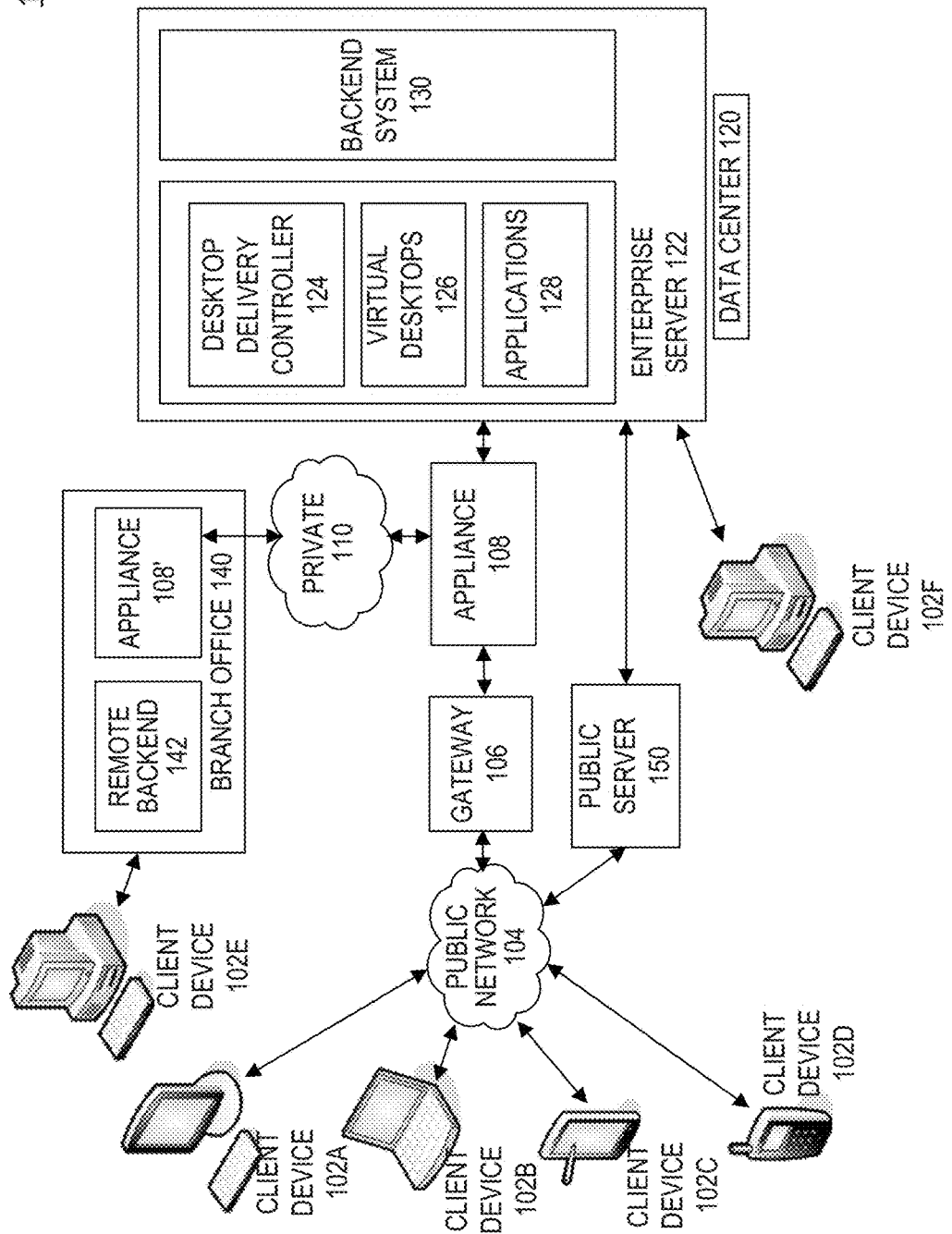
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102, public network 104, gateway 106, an appliance 108, a private network 110, a data center 120, a branch office 140, and a public server 150.

One or more client devices 102 are devices that can acquire remote services from data center 120 through various means. Client devices 102 can communicate with data center 120 either directly (e.g., client device 102F) or indirectly through public network 104 (e.g., client devices 102A-D) or private network 110 (e.g., client device 102E). When client device 102 communicates through public network 104 or private network 110, a communication link can be established. For example, a link can be established by public network 104, gateway 106, and appliance 108, thereby providing a client device (e.g. client devices 102A-D) access to data center 120. A link can also be established by branch office 140 including appliance 108', private network 110, and appliance 108, thereby providing a client device (e.g. client device 102E) access to data center 120. While client devices 102 are portrayed as a computer (e.g., client devices 102A, 102E, and 102F), a laptop (e.g., client device 102B), a tablet (e.g., client device 102C), and a mobile smart phone (e.g., client device 102D), it is appreciated that client device 102 could be any type of device (e.g., wearable or smart watch) that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network or a wireless network.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway has the ability to modify signals received from client device 102 into signals that appliance 108 and/or data center 120 can understand and vice versa.

Appliance 108 is a device that optimizes wide area network (WAN) traffic by including, for example, a quality of service ("QoS") engine. In some embodiments, appliance 108 optimizes other types of network traffic, such as local area network (LAN) traffic, metropolitan area network (MAN) traffic, or wireless network traffic. Appliance 108 can optimize network traffic by, for example, scheduling data packets in an established communication link so that the data packets can be transmitted or dropped at a scheduled time and rate. In some embodiments, appliance 108 is a physical device, such as Citrix System's ByteMobile™, Netscaler™, or CloudBridge™. In some embodiments, appliance 108 can be a virtual appliance. In some embodiments, appliance can be a physical device having multiple instances of virtual machines (e.g., virtual Branch Repeater). A first appliance (e.g., appliance 108) can work in conjunction with or in cooperation with a second appliance (e.g., appliance 108') to optimize network traffic. For example, the first appliance can be located between the WAN and a corporate LAN (e.g., data center 120), while the second appliance can be located between branch office (e.g., branch office 140) and a WAN connection. In some embodiments, the functionality of gateway 106 and appliance 108 can be located in a single physical device. Moreover, in some embodiments, appliance 108 and gateway 106 can be part of the same device. Appliances 108 and 108' can be functionally the same or similar. Appliance 108 is further described below corresponding to FIG. 3.

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., enterprise server 122) and a backend system 130. In some embodiments data center 120 can include gateway 106, one or more appliances 108, or a combination of both.

Enterprise server 122 is an entity represented by an IP address and can exist as a single entity or a member of a server farm. Enterprise server 122 can be a physical server or a virtual server. In some embodiments, enterprise server 122 can include a hardware layer, an operating system, and a hypervisor creating or managing one or more virtual machines. Enterprise server 122 provides one or more services to an endpoint. These services include providing one or more applications 128 to one or more endpoints (e.g., client devices 102A-F or branch office 140). For example, applications 128 can include Microsoft Windows™-based applications and computing resources.

Desktop delivery controller 124 is a device that enables delivery of services, such as virtual desktops 126 to client devices 102A-F or branch office 140. Desktop delivery controller 124 provides functionality required to manage, maintain, and optimize all virtual desktop communications.

In some embodiments, the services include providing one or more virtual desktops 126 that can provide one or more applications 128. Virtual desktops 126 can include hosted shared desktops, allowing multiple users to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 130 is a single or multiple instances of computer networking hardware, appliances, or servers in a server farm or a bank of servers and interfaces directly or indirectly with enterprise server 122. For example, backend system 130 can include Microsoft Active Directory™, which can provide a number of network services, including lightweight directory access protocol (LDAP) directory services, Kerberos-based authentication, domain name system (DNS)-based naming and other network information, and synchronization of directory updates amongst several servers. Backend system 130 can also include, among other things, an Oracle™ backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of a local area network (LAN) that is part of the Wireless LAN (WLAN) having data center 120. Branch office 140 can include, among other things, appliance 108' and remote backend 142. In some embodiments, appliance 108' can sit between branch office 140 and private network 110. As stated above, appliance 108' can work with appliance 108. Remote backend 142 can be set up in similar manner as backend system 130 of data center 120. Client device 102E can be located on-site to branch office 140 or can be located remotely from branch office 140.

Public server 150 is an entity represented by an IP address. Public server 150 can be a physical server or a virtual server. In some embodiments, public server 150 can include a hardware layer, an operating system, and a security agent issuing security-related parameters such as public keys, cipher certificates, session identifiers and session tickets, and managing one or more secure connections. Public server 150 can be accessed directly or indirectly by client devices 102A-F. Public server 150 provides one or more services to an endpoint. These services include one or more applications, such as web-browser applications, to one or more endpoints (e.g., client devices 102A-F, data center 120, or branch office 140). Public server 150 can provide secure connections using Internet security protocols, e.g., SSL/TLS protocols, for secure services to one or more endpoints (e.g., client devices 102A-F, data center 120, or branch office 140). The present application describes improved efficiency of SSL/TLS connections by proxying connections between a middlebox and another middlebox or public server 150. However, it is appreciated that the disclosed method can be applicable on any kind between two apparatuses to improve efficiency of SSL/TLS connections.

Appliances 108 and 108' and gateway 106 can be deployed as or executed on any type and form of specific computing device (e.g., such as the computing device of FIGS. 2A-2B) capable of communicating on any type and form of network described herein. Appliances 108 and 108' can be deployed individually or as a pair operatively connected together.

Figure 2B:
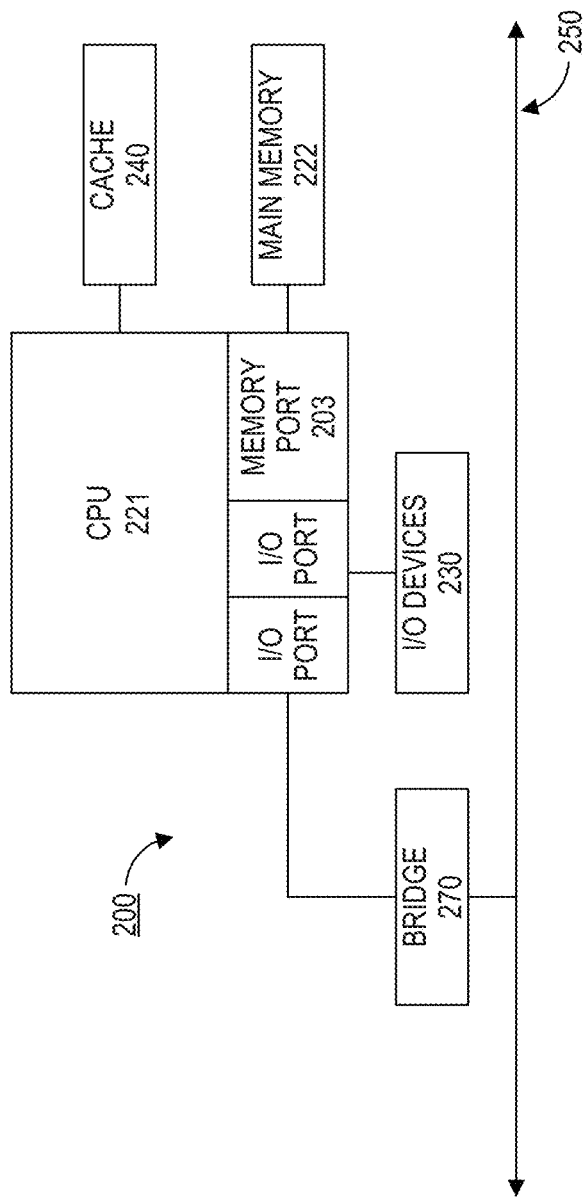

As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with main memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus (not shown), sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port (not shown). In further embodiments, I/O device 230 can be a bridge 270 between system bus 250 and an external communication bus, such as a USB bus, an Apple Desktop Bus, an RS-232 serial connection, a SCSI bus, a FireWire™ bus, a FireWire 800™ bus, an Ethernet bus, an AppleTalk™ bus, a Gigabit Ethernet bus, an Asynchronous Transfer Mode bus, a HIPPI bus, a Super HIPPI bus, a SerialPlus bus, a SCI/LAMP bus, a FibreChannel™ bus, or a Serial Attached small computer system interface bus, or some other type of data bus.

As shown in FIG. 2A, computing device 200 can support any suitable installation device 216, such as a disk drive or other input port for receiving one or more computer-readable media such as, for example, a USB device, flash drive, SD memory card; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of links including, but not limited to, standard telephone lines, LAN or WAN links (e.g., 802.11, T1, T3, 56 kb, X.25), broadband links (e.g., ISDN, Frame Relay, ATM), wireless connections (Wi-Fi, Bluetooth, Z-Wave, Zigbee), or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3:
FIG. 3 is a block diagram of an exemplary appliance illustrated in FIG. 1, consistent with embodiments of the present disclosure.

FIG. 3 is a block diagram of an exemplary appliance 108 and/or 108' illustrated in FIG. 1, consistent with embodiments of the present disclosure. Appliance 108 can include an SSL session exchange module 322, an SSL pre-handshake establishment module 342, and one or more network interfaces 218A-N consistent with network interface 218 of FIG. 2A. Although FIG. 3 depicts network interfaces 218A-218N as two network interfaces, it is appreciated that interfaces 218A-218N can include any number of network interfaces.

SSL session exchange module 322 is a module, which is a packaged functional hardware unit designed for use with other components or a part of a program that performs a particular function of related functions. In some aspects, SSL session exchange module 322 can operate on two or more devices, for example, in branch office 140 or at data center 120, and public server 150, functionally connected to provide more efficient SSL/TLS connections. Each device having SSL session exchange module 322 can be configured to perform SSL full handshake procedure to make a secure session connection between client devices 102 and appliance 108 or 108', and between appliance 108 or 108' and a public server 150.

SSL pre-handshake establishment module 342 is a module for providing more efficient pre-establishment of SSL/TLS session connections for faster SSL connections. In some aspects, SSL pre-handshake establishment module 342 can operate on two or more devices, for example, in branch office 140 or at data center 120, and public server 150, functionally connected to provide this functionality. Each device having SSL pre-handshake establishment module 342 can be configured to facilitate a secure session connection between a client device and a server associated with a website, wherein the facilitation causes the appliance to receive session information, determine whether session information corresponding to the secure session connection request has been cached, determine whether the server is associated with a server group based on the determination that session information has not been cached, and form secure session connections between the client device and servers listed in the server group based on the determination that the server is associated with a server group. SSL pre-handshake establishment module 342 can be configured to identify a server group based on information of the server associated with the website in the secure session connection request. The secure session connection request can include a name of the server associated with the website in a server name indicator (SNI) field of a data packet (e.g., Client Hello packet). The name of the server in a server name indicator field can be matched to a head server name, as shown in FIG. 9. The servers listed in the server group comprise a head server name and a plurality of sub-servers names, a head server representing at least one webpage and comprising a plurality of objects provided by the plurality of sub-servers to load completely the at least one webpage.

SSL pre-handshake establishment module 342 can also be configured to determine whether there is a matching server among the head server name and the plurality of sub-servers names in the server group, the matching server matching to the server associated with the website. SSL pre-handshake establishment module 342 can also be configured to increase a frequency count of the matching server based on the determination that there is a matching server. SSL pre-handshake establishment module 342 can also be configured to reuse at least one session to one or more servers listed in the server group, for example, by forming a shorten SSL/TLS handshake in accordance with Internet Engineering Task Force (IETF) Request For Comments (RFC) 5077, based on the determination that session information corresponding to the secure session connection request has been cached. The session information comprises at least one of session identifier and session ticket information that can be acquired based on a SSL/Transport Layer Security (TLS) full handshake protocol. SSL pre-handshake establishment module 342 can further be configured to accumulate the session connection request and subsequent session connection requests for a predetermined time period, based on the determination that session information corresponding to the session connection request and the subsequent session connection requests has not been cached, determine whether there are one or more matching servers in the server group matching to the session connection request and the subsequent session connection requests, update a frequency count of each of the one or more matching servers based on the determination that there are the one or more matching servers, and add or delete at least one server from the server group based on a number of the frequency count.

Figure 4:
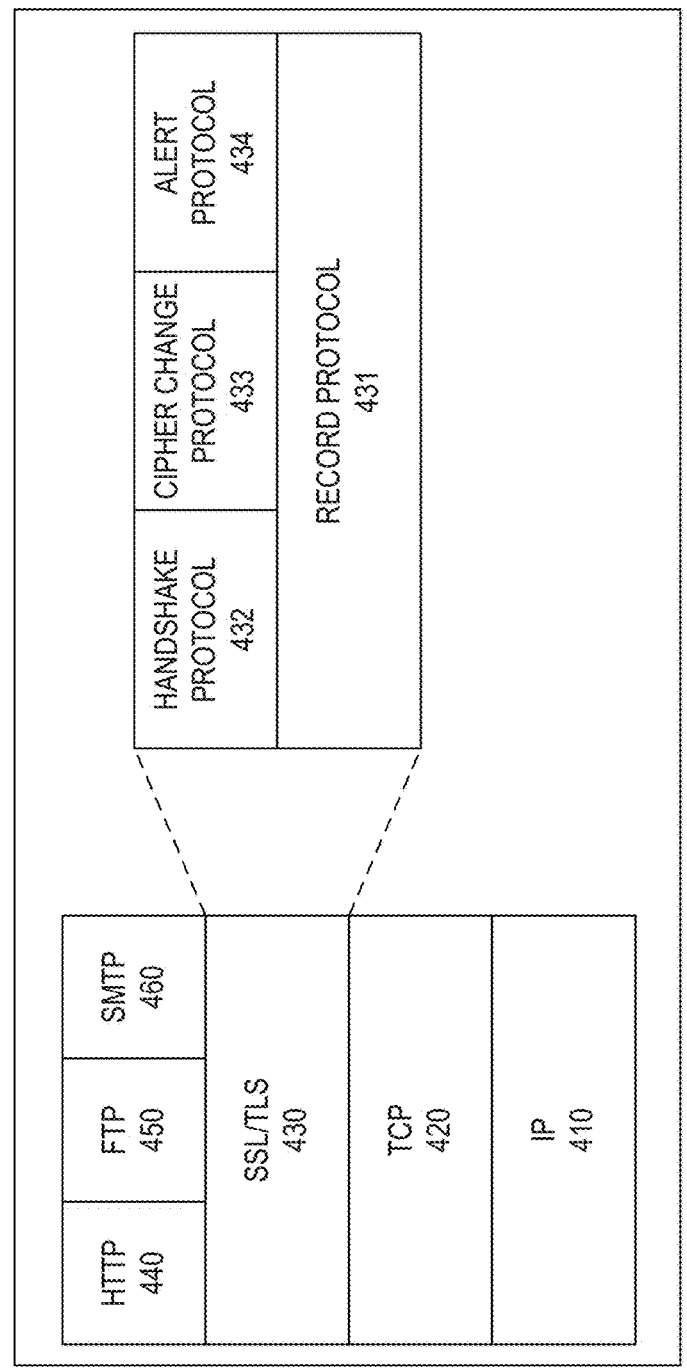
FIG. 4 is a block diagram of an exemplary protocol stack of appliance, consistent with embodiments of the present disclosure.

FIG. 4 is a block diagram of an exemplary protocol stack 400 of appliance 108 and/or 108', consistent with embodiments of the present disclosure. According to some embodiments, appliance 108 and/or 108' can be configured to have a security layer, e.g., SSL/TLS layer 430. The SSL/TLS layer 430 can include SSL session exchange module 322 (depicted in FIG. 3) and a secure socket Application Programming Interface (API) (not shown). The security layer, e.g., SSL/TLS layer 430 of FIG. 4, can use underlying layers for reliable communications. Such underlying layers can be provided by, e.g., Transport Control Protocol (TCP) layer 420 and Internet Protocol (IP) layer 410. Applications, such as web service applications, can use the secure socket API to encrypt communication with any remote application that communicates according to SSL/TLS protocol. Any standard Internet web browser on public server 150 can be accessed by secure web server applications using application protocols such as HyperText Transfer Protocol (HTTP) 440, File Transfer Protocol (FTP) 450, Simple Mail Transfer Protocol (SMTP) 460, etc. on top of SSL/TLS 430.

In some embodiments, SSL/TLS layer 430 can include a record protocol layer 431, a handshake protocol layer 432, cipher change protocol layer 433, and alert protocol layer 434, as referenced in IETF RFC 6101. The record protocol layer 431 can receive uninterpreted data from higher layers, e.g., application layer. The record protocol layer 431 is responsible for fragmenting uninterpreted data with fixed length and encrypting packets that were broken down with fixed-length compressing the data. The record protocol layer 431 is also responsible for adding SSL header in the packets.

The handshake protocol layer 432 that operates on top of the record protocol layer 431 can produce cryptographic parameters of session state. As an example, primary SSL session exchange module 322A that operates in application 108A can act as an SSL client, and public server 150 can act as an SSL server. When an SSL client and an SSL server first start communicating, the SSL client and the SSL server agree on a protocol version, select cryptographic algorithms, optionally authenticate each other, and use public key encryption techniques to generate shared secrets. These processes are performed in the handshake protocol, which can be summarized as follows: the SSL client sends a client hello message to which the SSL server must respond with a server hello message, or else a fatal error will occur and the connection will fail. The SSL client hello and SSL server hello are used to establish security enhancement capabilities between the SSL client and the SSL server. The client hello and server hello establish the following attributes: Protocol Version, Session ID, Cipher Suite, and Compression Method. Additionally, two random values are generated and exchanged: ClientHello.random and ServerHello.random.

The cipher change protocol layer 433 is to signal transitions in ciphering strategies between the SSL client and the SSL server. In other words, sending (from the SSL client to the SSL server or vice versa) a message to notify that subsequent records are to be protected under just-negotiated CipherSpec and keys.

The alert protocol layer 434 supports alert messages to convey severity of a message and a description of an alert. An alert can include, for example, closure alerts and error alerts. Closure alerts are used to notify that a connection is ending in order to avoid a truncation attack. Error alerts are used to send an error message in the event of error detections. Upon transmission or receipt of a fatal alert message, both the SSL client and the SSL server immediately close a connection.

Figure 5:
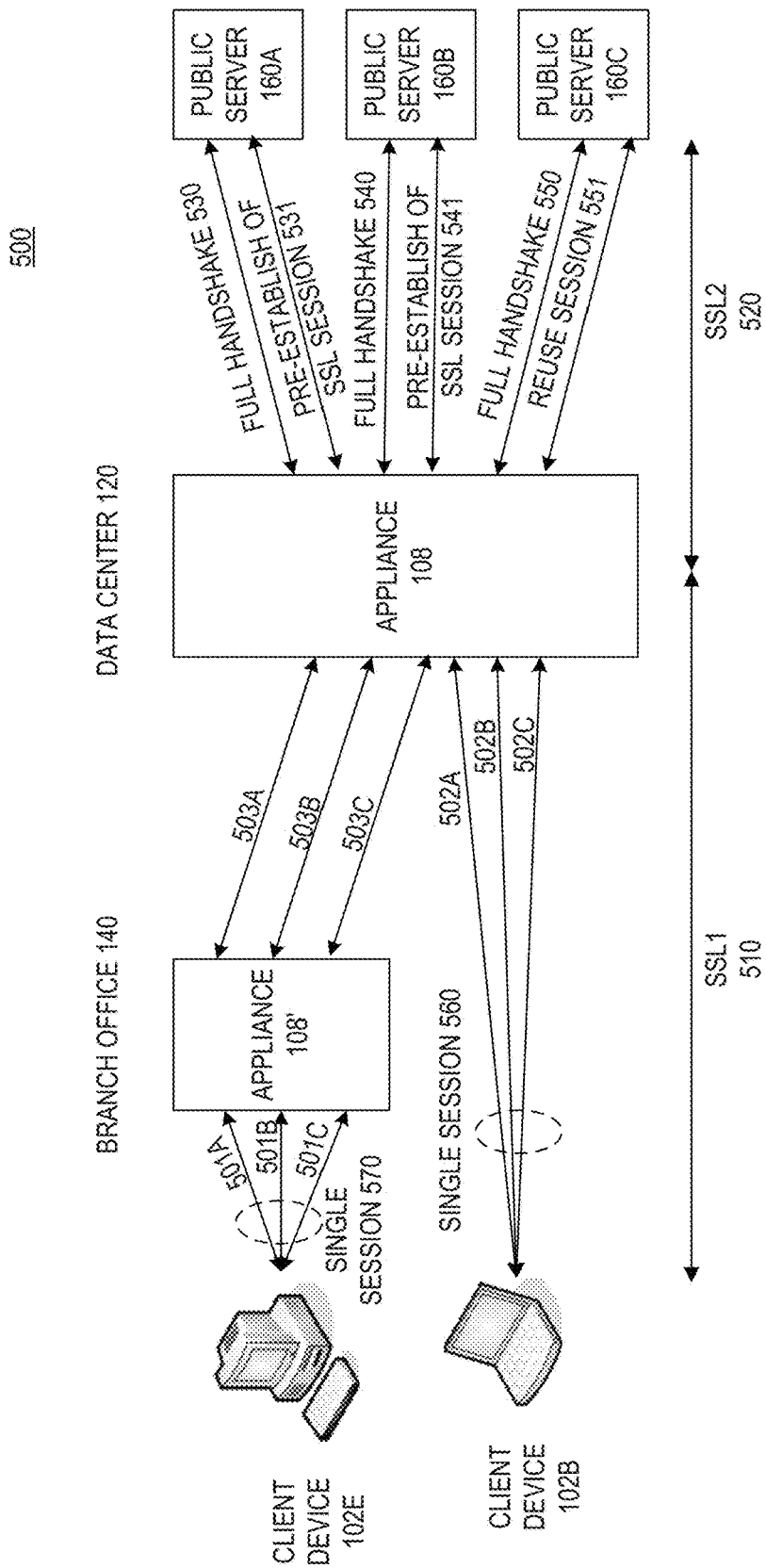
FIG. 5 is a block diagram of an exemplary network environment, consistent with embodiments of the present disclosure.

FIG. 5 is a block diagram of an exemplary network environment 500, consistent with embodiments of the present disclosure. It is appreciated that network environment 500 is a simplified illustration and that other components can be added in network environment 500 whenever necessary. Also, network environment 500 can be any type of network that communicates using packets. The network environment 500 can include a plurality of client devices 102 (e.g., 102B and 102E depicted in FIG. 5), appliance 108' coupled to branch office 140, appliance 108 that may be located in or out of data center 120, and a plurality of public servers 150 depicted in FIG. 1 and sub-servers 160A-160C depicted in FIG. 5). Although a single appliance 108' is shown in branch office 140 in FIG. 5, it is appreciated that one or more appliances 108' can be located in a plurality of branch offices 140. Likewise, although a single appliance 108 is shown in data center 120 in FIG. 5, it is appreciated that one or more appliances 108 can be associated with data center 120.

Network environment 500 can have a plurality of SSL/TLS connections at two or more stages between client device 102 and public server 150. As an example, there can be, at a first stage, a single session 560 comprising three SSL/TLS connections 502A-502C between client devices 102 (e.g., 102B) and appliance 108, the SSL/TLS connections between which refers to SSL1 510. In some embodiments, SSL1 510 can also have another single session 570 comprising three SSL/TLS connections 501A-501C between client device 102 (e.g., 102E) and appliance 108' in branch office 140, and three other SSL/TLS connections 503A-503C between appliance 108' in branch office 140 and appliance 108.

One or more client devices 102 can directly connect to appliance 108, or indirectly connect to appliance 108 via appliance 108' in branch office 140. For example, client device 102B is directly connected to appliance 108, and client device 102E is indirectly connected to appliances 108 via appliance 108' in branch office 140.

At a second stage, there can be other SSL/TLS connections (e.g., 530, 531, 540, 541, 550 and 551) between appliance 108 and one or more public servers 150 depicted in FIG. 1 and sub-servers 160A-160C depicted in FIG. 5, those SSL/TLS connections between which refer to SSL2 520.

The embodiments described herein address the SSL2 520 connections at the second stage for assisting with establishing a faster SSL connection by pre-establishing SSL session connections with one or more servers to load at least one complete webpage whose objects are embedded on the one or more servers. In exemplary embodiments, after receiving from a client device an SSL session connection request to a public server 150 associated with a website, appliance 108 can perform SSL/TLS full handshake procedures with the public server 150 associated with the website. The website can comprise a plurality of webpage objects to form at least one complete webpage. Some webpage objects can be embedded on one or more other servers. In the present disclosure, the one or more other servers are hereafter called sub-servers 160A-160C. The public server 150 associated with the website can provide appliance 108 with information about sub-servers 160A-160C. Then, using this information, appliance 108 can perform SSL/TLS full handshake procedures (e.g., 530, 540, and 550) with each of the sub-servers 160A-160C. Appliance 108 can acquire session information such as session identifier and/or session ticket information via SSL/TLS full handshake procedures. Such session information can be used to reuse at least one session connection (e.g., 551) to the server associated with the website and/or each of the sub-servers 160A-160C. Alternatively, appliance 108 can pre-establish at least one SSL session connection to the server associated with the website and/or each of the sub-servers 160A-160C, which is described in the following FIG. 6.

Figure 6:
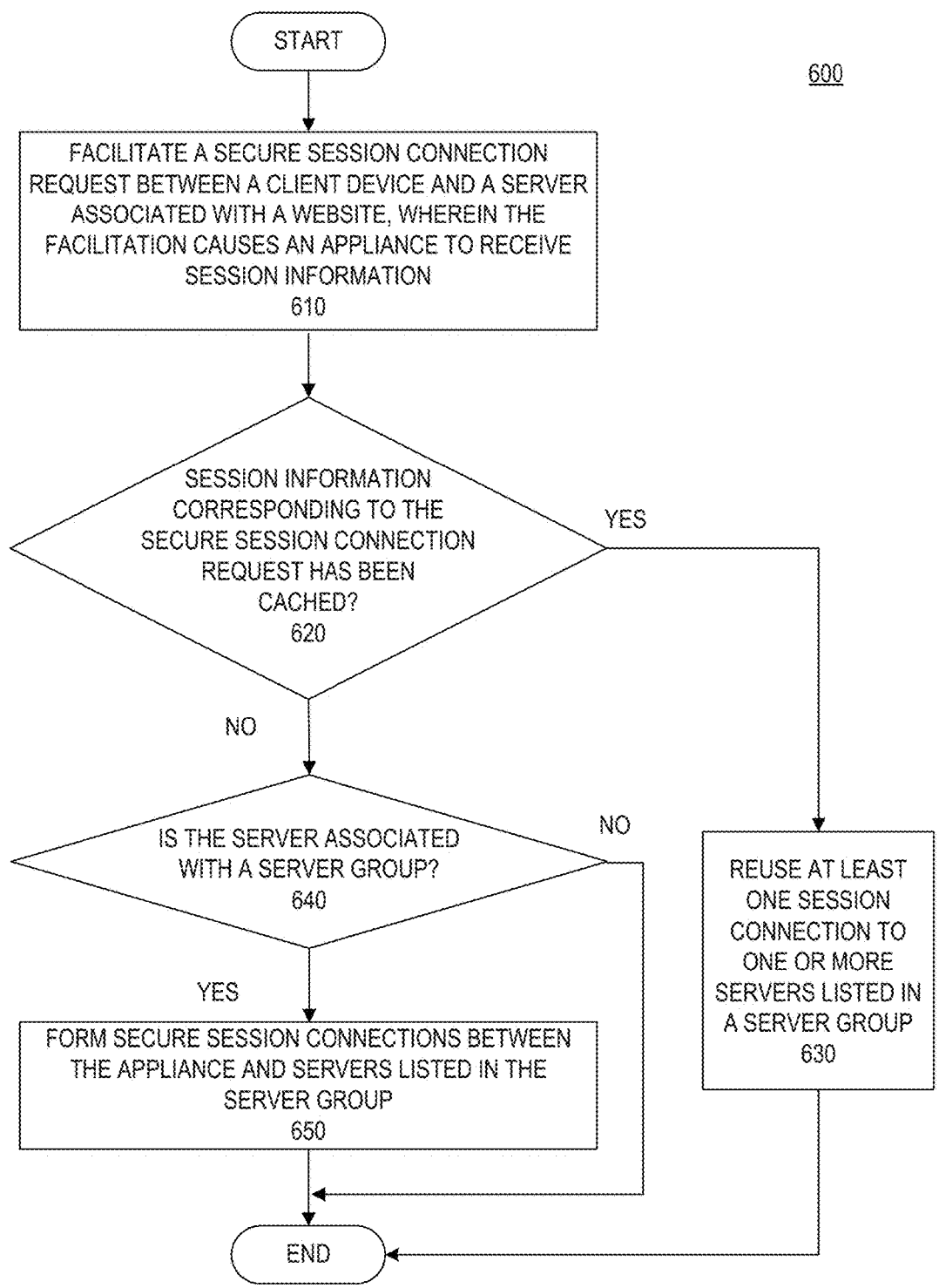
FIG. 6 is a flowchart representing an exemplary method of pre-establishing SSL session connections for faster SSL connection establishment, consistent with embodiments of the present disclosure.

FIG. 6 is a flowchart representing an exemplary method 600 of pre-establishing SSL session connections for faster SSL connection establishment, consistent with embodiments of the present disclosure. It will be readily appreciated that the illustrated procedure can be altered to delete steps or further include additional steps. While method 600 is described as being performed by appliance 108, it is appreciated that other components can be added or omitted and the method 600 can be performed by other devices alone (e.g., appliance 108') or in combination with appliance 108.

As an initial start, appliance 108 receives from a client device 102 (either directly or via an appliance at a branch office (e.g., appliance 108')) a secure session connection request to a server associated with a website at step 610. The secure session connection request can be an SSL session connection request. Appliance 108 also facilitates the secure session connection request between client device 102 and a server associated with a website, wherein the facilitation causes the appliance to receive session information at this step 610.

In exemplary embodiments, upon receipt of the secure session connection request from client device 102, appliance 108 can further forward the secure session connection request to the server associated with the website. Based on that request, appliance can 108 can receive from the server a list of sub-servers identifiers associated with the server, each sub-server having one or more objects required to form a webpage of the website. Appliance 108 can also receive, from the server, session information of each of the sub-servers.

In some embodiments, upon receipt of the secure session connection request from client device 102, appliance 108 can further access one or more data structures storing a server group having a server name, a plurality of sub-servers names associated with the server name, and session information of the server and each of sub-servers associated with the server. The server group can include other information which is used to facilitate a secure session connection request between client device and a server associated with a website.

Appliance 108 also determines whether session information corresponding to the secure session connection request has been cached at step 620. Session information can be obtained via SSL/TLS full handshake procedure. SSL/TLS full handshake procedure includes procedure disclosed in IETF RFC 6101. Session information can include session identifier or session ticket information. A session identifier is an arbitrary byte sequence chosen by a server to identify an active or resumable session state. Obtaining one or more session identifiers via SSL/TLS full handshake procedure is disclosed in IETF RFC 5246. A session ticket containing encrypted session state information is created by a TLS server (e.g., public server 150) and sent to a TLS client (e.g., appliance 108). TLS client can present the session ticket to the TLS server to resume a session. Obtaining one or more session tickets via SSL/TLS full handshake procedure is disclosed in IETF RFC 5077.

When session information corresponding to the secure session connection request has been cached, it means that the server can be associated with a server group at this step 620 or has been already associated with a server group before the step 620. Data structure providing a server group can be maintained per a client device 102 and is described in FIG. 9 in detail. When determining that the session information corresponding to the secure session connection request has been cached, appliance 108 reuses at least one session to one or more servers listed in the server group at step 630.

When determining that the session information corresponding to the secure session connection request has not been cached, appliance 108 determines whether the server is associated with a server group at step 640. When determining that the server is associated with a server group, appliance 108 further forms secure session connections between the appliance and servers listed in the server group at step 650. This formation assists with pre-establishing one or more SSL connections. Thus, whenever receiving one or more SSL connection requests in the future the one or more pre-established SSL connections can be used without necessarily performing full SSL handshake procedures, which in turn saves one RTT and computational intensive task for new secure session connections and enhances user experience.

Figure 7:
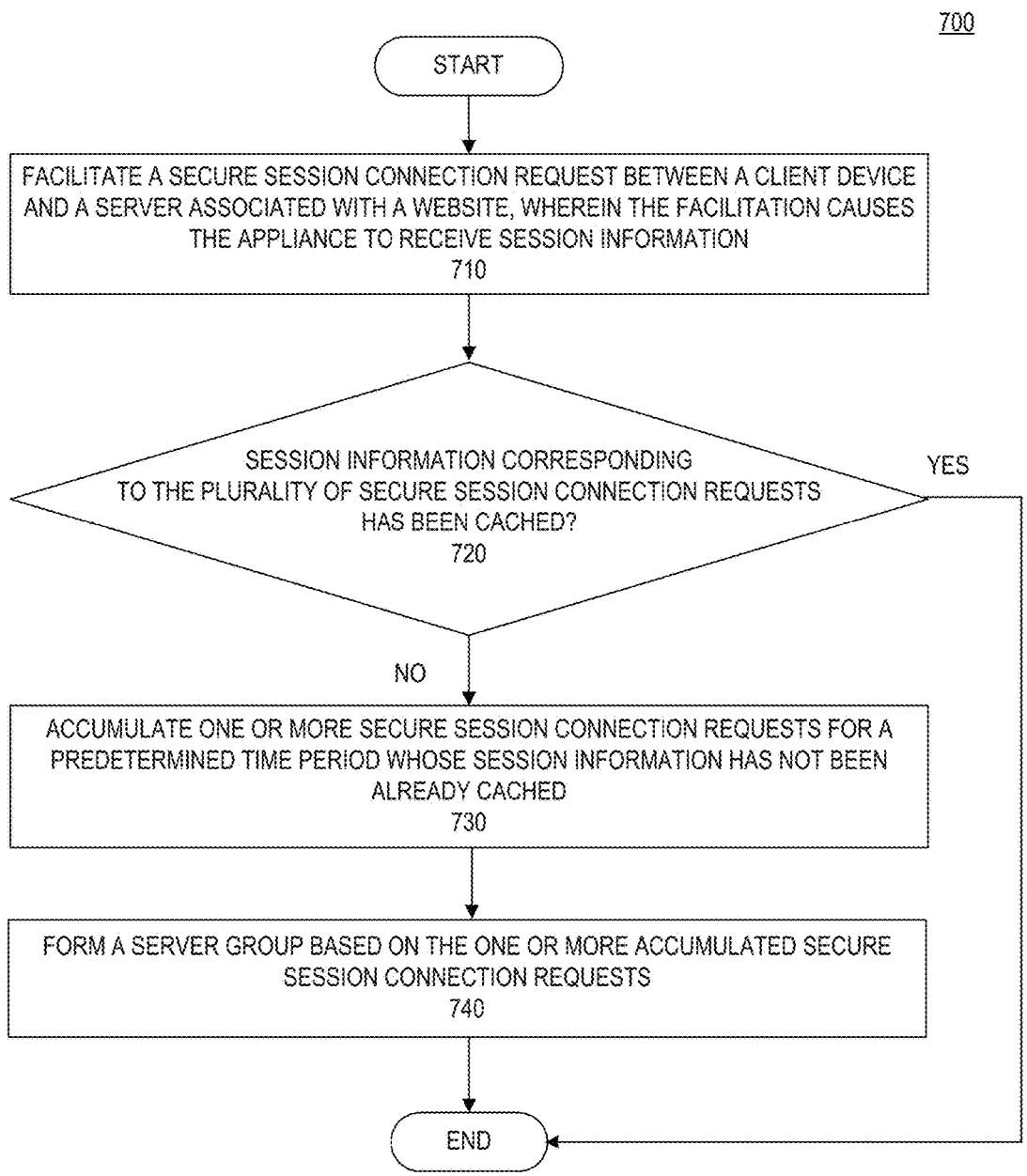
FIG. 7 is a flowchart representing an exemplary method of forming a server group, consistent with embodiments of the present disclosure.

FIG. 7 is a flowchart representing an exemplary method 700 of forming a server group, consistent with embodiments of the present disclosure. It will be readily appreciated that the illustrated procedure can be altered to delete steps or further include additional steps. While method 700 is described as being performed by an appliance 108, it is appreciated that other components can be added or omitted and the method 700 can be performed by other devices alone (e.g., appliance 108') or in combination with appliance 108.

At step 710, Appliance 108 facilitates a secure session connection request between client device 102 and a server associated with a website, wherein the facilitation causes the appliance to receive session information at step 710. The secure session connection request can be an SSL session connection request.

In some embodiments, upon receipt of the secure session connection request from client device 102, appliance 108 can further access one or more data structures storing a server group having a server name, a plurality of sub-servers names associated with the server name, and session information of the server and each of sub-servers associated with the server. The server group can include other information which is used to facilitate a secure session connection request between client device and a server associated with a website.

Appliance 108 also determines whether session information corresponding to the plurality of secure session connection requests has been cached at step 720. As described above, session information can include session identifier or session ticket information which can be obtained via SSL/TLS full handshake procedure based on IETF RFC 5246 or IETF RFC 5077, respectively.

When determining that session information corresponding to the plurality of secure session connection requests has not been cached, appliance 108 also accumulates one or more secure session connection requests for a predetermined time period at step 730. For example, appliance 108 receives 10 secure connection requests from a client device for 0.5 seconds and determines that session information corresponding to 7 secure connection requests among 10 received secure connection requests has not been cached. Then, appliance 108 accumulates 7 secure connection requests to form a server group. Appliance 108 can configure a predetermined time period how long to accumulate one or more secure session connection requests.

At step 740, appliance 108 further forms a server group based on the one or more accumulated secure session connection requests whose session information has not been cached. Appliance 108 forms a server group including, for example as shown in FIG. 9, a head server name 930A, frequency count of the head server name 931A, list of sub-server names 940A, frequency count of each of the sub-server names 942A-942C, session-related parameter 950A, and timeout 960A. Appliance 108 can perform full SSL handshake procedures to acquire session information of the head server and the sub-server listed in the server group. Appliance 108 can terminate pre-established connections at expiry of timeout 960A. Appliance 108 can also store the server group information in a memory locally in the appliance 108 or externally connected to a network database.

Figure 8:
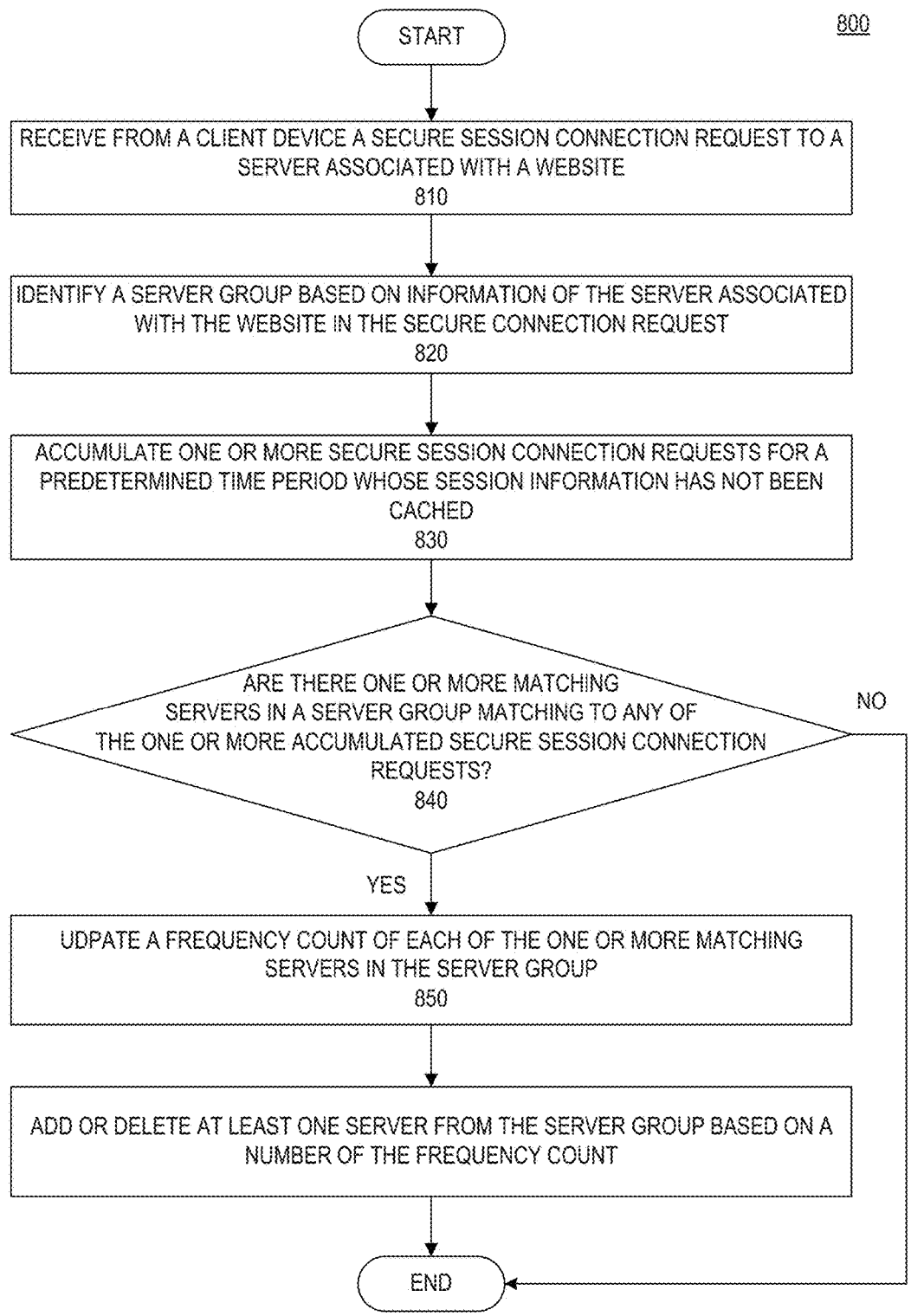
FIG. 8 is a flowchart representing an exemplary method of refining a server group, consistent with embodiments of the present disclosure.

Referring now to FIG. 8, a flowchart representing an exemplary method 800 of refining a server group, consistent with embodiments of the present disclosure. It will be readily appreciated that the illustrated procedure can be altered to delete steps or further include additional steps. While method 800 is described as being performed by appliance 108, it is appreciated that other components can be added or omitted and the method 800 can be performed by other devices alone (e.g., appliance 108') or in combination with appliance 108.

At step 810, appliance 108 receives from a client device 102 a secure session connection request to a server associated with a website at step 810. Appliance 108 identifies a server group based on information of the server associated with the website in the secure connection request at step 820. For example, appliance 108 can search a server group to see if there is a server name in the server group which matches to a server name associated with a website in the secure session connection request. When finding the same server name in the server group, appliance 108 can identify the server group affiliated with the server associated with the website in the secure connection request.

Appliance 108 accumulates one or more secure session connection requests for a predetermined time period whose session information has not been cached at step 830. For example, appliance 108 receives 10 secure connection requests from a client device for 0.5 seconds and determines that session information corresponding to 7 secure connection requests among 10 received secure connection requests has not been cached. Then, appliance 108 accumulates 7 secure connection requests to use refining a server group. Appliance 108 can configure a predetermined time period how long to accumulate one or more secure session connection requests.

At step 840, appliance 108 determines whether there are one or more matching servers in a server group matching to any of the one or more accumulated secure session connection requests. When determining that there are one or more matching servers in the server group, appliance 108 updates a frequency count of each of the one or more matching servers in the server group at step 850. In exemplary embodiments, when determining that a server name in secure session connection requests matches to a server name in a server group three times and assuming that a current frequency count value be 2, appliance 108 updates frequency count of the server to 5.

Appliance 108 further adds or deletes at least one server from the server group based on a number of the frequency count. In exemplary embodiment, there can be a preconfigured frequency count threshold in the server group. The updated number of the frequency count of each of the one or more matching servers in the server can be compared with the preconfigured frequency count threshold. As an example, appliance 108 can determine to add a server into a server group when the server's frequency count is equal to or higher than the preconfigured frequency count threshold. Appliance 108 can also add a server into a server group when an SSL session connection to the server is established within a preconfigured time period, e.g., 0.5 second, given that SSL session information of the SSL session connection to the server has not been cached. Appliance 108 can also determine to delete a server from a server group when the server's frequency count is less than the preconfigured frequency count threshold.

When the client device sends a secure session connection request to each of the sub-servers, appliance 108 can determine a list of server names in multiple server groups by accumulating all new SSL connections made by a client device within a pre-configured time period (e.g., 0.5 second). Appliance 108 can form multiple server groups of server names that are formed based on the SSL connections formed by a particular client device to load a web page or a set of web pages. While forming the multiple server group, appliance 108 does not count the SSL connection whose session details have been already cached.

FIG. 9 is an exemplary data structure providing a server group for a client device. Server group for a client device 910 comprises a plurality of server group identifiers (IDs), e.g., 920A and 920B. Each of the plurality of server group IDs, e.g., 920A and 920B comprises a head server name 930A, frequency count of the head server name 931A, list of sub-server names 940A, frequency count of each of the sub-server names 942A-942C, session-related parameter 950A, and timeout 960A. Each of sub-server names comprises a plurality of server names 941A-941C and corresponding frequency counts 942A-942C to each of the plurality of server names 941A-941C. Session-related parameter 950A can comprise session information such as session identifier 951A and session ticket 952. If session information of session identifier 951A can comprise session identifier, session ID length, chosen ciphersuite, chosen compression, start time, max fragment length, the master key and other related flags and details. If session information of session ticket 952 can comprise session ticket, session ticket length, and session ticket lifetime. Timeout 960A indicates a valid time period that the server group ID 920A becomes valid. After expiry of the timeout 960A value, the server group ID 920A becomes obsolete and/or is deleted from the data structure. Server Group ID 920B has substantially similar server group parameter information compared with those of Server Group ID 920A.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An appliance of pre-establishing Secure Socket Layer (SSL) session connections for SSL connection establishment, the appliance comprising: a secure session pre-handshake establishment module configured to:
   facilitate a secure session connection request between an appliance and a server associated with a website, with the secure session connection request including a name of the server associated with the website, wherein the facilitation causes the appliance to receive session information;
   determine whether session information corresponding to the secure session connection request has been cached;
   determine whether the name of the server is associated with server names listed in a server group based on the determination that session information has not been cached; and
   form secure session connections between the appliance and servers listed in the server group, based on the determination that the name of the server is associated with one of the server names listed in the server group, to pre-establish one or more SSL connections so that when one or more SSL connection requests are received, the one or more pre-established SSL connections can be used without performing full SSL handshake procedures.

2. The appliance of claim 1, wherein the secure session pre-handshake establishment module is further configured to identify the server group based on information of the server associated with the website in the secure session connection request.

3. The appliance of claim 1, wherein the names of the servers listed in the server group comprise a head server name and a plurality of sub-servers names, a head server representing at least one webpage and comprising a plurality of objects provided by the plurality of sub-servers to load completely the at least one webpage.

4. The appliance of claim 3, wherein the secure session pre-handshake establishment module is further configured to determine whether there is a matching server among the head server name and the plurality of sub-servers names in the server group, the matching server matching to the server associated with the website.

5. The appliance of claim 4, wherein the secure session pre-handshake establishment module is further configured to increase a frequency count of the matching server based on the determination that there is a matching server.

6. The appliance of claim 1, wherein the secure session pre-handshake establishment module is further configured to reuse at least one session to one or more servers listed in the server group based on the determination that session information corresponding to the secure session connection request has been cached.

7. The appliance of claim 1, wherein the session information comprises at least one of session identifier and session ticket information.

8. The appliance of claim 7, wherein the session information is acquired based on a SSL/Transport Layer Security (TLS) full handshake protocol.

9. The appliance of claim 1, wherein the secure session pre-handshake establishment module is further configured to:
accumulate the session connection request and subsequent session connection requests for a predetermined time period, based on the determination that session information corresponding to the session connection request and the subsequent session connection requests has not been cached;
determine whether there are one or more matching servers in the server group matching to the session connection request and the subsequent session connection requests; and
update a frequency count of each of the one or more matching servers based on the determination that there are the one or more matching servers.

10. The appliance of claim 9, wherein the secure session pre-handshake establishment module is further configured to add or delete at least one server from the server group based on a number of the frequency count.

11. The appliance of claim 1, wherein the secure session pre-handshake establishment module is further configured to:
accumulate SSL connections made by a client device for a predetermined time period; and
determine a list of one or more server names belonging to the server group based on the accumulated SSL connections.

12. A method of pre-establishing Secure Socket Layer (SSL) session connections for SSL connection establishment, the method comprising:
facilitating a secure session connection request between an appliance and a server associated with a website, with the secure session connection request including a name of the server associated with the website, wherein the facilitation causes the appliance to receive session information;
determining whether session information corresponding to the secure session connection request has been cached;
determining whether the name of the server is associated with server names listed in a server group based on the determination that session information has not been cached; and
forming secure session connections between the appliance and servers listed in the server group, based on the determination that the name of the server is associated with a server group one of the server names listed in the server group, to pre-establish one or more SSL connections so that when one or more SSL connection requests are received, the one or more pre-established SSL connections can be used without performing full SSL handshake procedures.

13. The method of claim 12, further comprising identifying the server group based on information of the server associated with the website in the secure session connection request.

14. The method of claim 12, wherein the names of the servers listed in the server group comprise a head server name and a plurality of sub-servers names, a head server representing at least one webpage and comprising a plurality of objects provided by the plurality of sub-servers to load completely the at least one webpage.

15. The method of claim 14, further comprising determining whether there is a matching server among the head server name and the plurality of sub-servers names in the server group, the matching server matching to the server associated with the website.

16. The method of claim 15, further comprising increasing a frequency count of the matching server based on the determination that there is a matching server.

17. The method of claim 12, further comprising reusing at least one session to one or more servers listed in the server group based on the determination that session information corresponding to the secure session connection request has been cached.

18. The method of claim 12, wherein the session information comprises at least one of session identifier and session ticket information.

19. The method of claim 18, wherein the session information is acquired based on a SSL/Transport Layer Security (TLS) full handshake protocol.

20. The method of claim 12, further comprising:
accumulating the session connection request and subsequent session connection requests for a predetermined time period, based on the determination that session information corresponding to the session connection request and the subsequent session connection requests has not been cached;
determining whether there are one or more matching servers in the server group matching to the session connection request and the subsequent session connection requests; and
updating a frequency count of each of the one or more matching servers based on the determination that there are the one or more matching servers.

21. The method of claim 20, wherein the secure session pre-handshake establishment module is further configured to add or delete at least one server from the server group based on a number of the frequency count.

22. The method of claim 12, wherein the secure session pre-handshake establishment module is further configured to:
accumulate SSL connections made by a client device for a predetermined time period; and
determine a list of one or more server names belonging to the server group based on the accumulated SSL connections.

23. A non-transitory computer readable storage medium that stores a set of instructions that are executable by at least one processor of an appliance to cause the appliance to perform a method of pre-establishing Secure Socket Layer (SSL) session connections for SSL connection establishment, the method comprising:

facilitating a secure session connection request between an appliance and a server associated with a website, with the secure session connection request including a name of the server associated with the website, wherein the facilitation to causes the appliance to receive session information;

determining whether session information corresponding to the secure session connection request has been cached;

determining whether the name of the server is associated with server names listed in a server group based on the determination that session information has not been cached; and forming secure session connections between the appliance and servers listed in the server group, based on the determination that the name of the server is associated with one of the server names listed in the server group, to pre-establish one or more SSL connections so that when one or more SSL connection requests are received, the one or more pre-established SSL connections can be used without performing full SSL handshake procedures.

24. The non-transitory computer readable storage medium of claim 23, wherein the set of instructions that are executable by the at least one processor of the appliance to cause the appliance to further perform:

identifying the server group based on information of the server associated with the website in the secure session connection request.

25. The non-transitory computer readable storage medium of claim 23, wherein the names of the servers listed in the server group comprise a head server name and a plurality of sub-servers names, a head server representing at least one webpage and comprising a plurality of objects provided by the plurality of sub-servers to load completely the at least one webpage.

26. The non-transitory computer readable storage medium of claim 25, wherein the set of instructions that are executable by the at least one processor of the appliance to cause the appliance to further perform: determining whether there is a matching server among the head server name and the plurality of sub-servers names in the server group, the matching server matching to the server associated with the website.

27. The non-transitory computer readable storage medium of claim 26, wherein the set of instructions that are executable by the at least one processor of the appliance to cause the appliance to further perform: increasing a frequency count of the matching server based on the determination that there is a matching server.

28. The non-transitory computer readable storage medium of claim 23, wherein the set of instructions that are executable by the at least one processor of the appliance to cause the appliance to further perform: reusing at least one session to one or more servers listed in the server group based on the determination that session information corresponding to the secure session connection request has been cached.

29. The non-transitory computer readable storage medium of claim 23, wherein the session information comprises at least one of session identifier and session ticket information.

30. The non-transitory computer readable storage medium of claim 29, wherein the session information is acquired based on a SSL/Transport Layer Security (TLS) full handshake protocol.

31. The non-transitory computer readable storage medium of claim 23, wherein the set of instructions that are executable by the at least one processor of the appliance to cause the appliance to further perform:

accumulating the session connection request and subsequent session connection requests for a predetermined time period, based on the determination that session information corresponding to the session connection request and the subsequent session connection requests has not been cached;

determining whether there are one or more matching servers in the server group matching to the session connection request and the subsequent session connection requests; and updating a frequency count of each of the one or more matching servers based on the determination that there are the one or more matching servers.

32. The non-transitory computer readable storage medium of claim 31, wherein the secure session pre-handshake establishment module is further configured to add or delete at least one server from the server group based on a number of the frequency count.

33. The non-transitory computer readable storage medium of claim 23, wherein the secure session pre-handshake establishment module is further configured to:

accumulate SSL connections made by a client device for a predetermined time period; and determine a list of one or more server names belonging to the server group based on the accumulated SSL connections.

* * * * *